United States Patent
Park et al.

(10) Patent No.: US 6,259,751 B1
(45) Date of Patent: Jul. 10, 2001

(54) CIRCUIT AND METHOD FOR REMOVING INTERFERENCE IN DIGITAL COMMUNICATION SYSTEM

(75) Inventors: Chang-Yong Park, Seoul; Kyoung-Whoan Suh, Kyonggi-do, both of (KR)

(73) Assignee: SamSung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/005,151

(22) Filed: Jan. 9, 1998

(30) Foreign Application Priority Data

Jan. 10, 1997 (KR) .................................. 479/1997

(51) Int. Cl.⁷ .................................................. H04B 1/10
(52) U.S. Cl. ........................................... 375/346; 375/232
(58) Field of Search .................................... 375/346, 232, 375/340, 324, 348, 316

(56) References Cited

U.S. PATENT DOCUMENTS

| | | | |
|---|---|---|---|
| 3,644,830 | * 2/1972 | Ragsdale | ................................. 333/18 |
| 4,021,738 | 5/1977 | Gitlin et al. . | |
| 4,320,523 | 3/1982 | Horikawa et al. . | |
| 4,468,786 | 8/1984 | Davis . | |
| 4,703,282 | 10/1987 | Yoshida . | |
| 4,707,841 | * 11/1987 | Yen et al. | ............................. 375/354 |
| 4,713,829 | * 12/1987 | Eyuboglu | ............................. 375/259 |
| 4,730,343 | 3/1988 | Kanemasa et al. . | |
| 5,157,690 | 10/1992 | Buttle . | |
| 5,251,233 | 10/1993 | Labedz et al. . | |
| 5,363,411 | 11/1994 | Furuya et al. . | |
| 5,394,110 | 2/1995 | Mizoguchi . | |
| 5,418,816 | 5/1995 | Yamamoto . | |
| 5,502,507 | 3/1996 | Kim . | |
| 5,519,727 | 5/1996 | Okanoue et al. . | |
| 5,524,124 | 6/1996 | Koenig . | |
| 5,870,432 | * 2/1999 | Kerckhove | ........................... 375/232 |
| 5,880,629 | * 3/1999 | Maeda | .................................. 375/233 |
| 6,044,107 | * 3/2000 | Gatherer et al. | ..................... 375/222 |

\* cited by examiner

*Primary Examiner*—Temesghen Ghebretinsae
(74) *Attorney, Agent, or Firm*—Robert E. Bushnell, Esq.

(57) ABSTRACT

A circuit for removing interference in a digital communications system includes: a signal processing unit for receiving a given signal and limiting the band of the signal, thereby distributing the signal to be outputted; a local oscillator for producing a carrier wave signal to be outputted; a signal mixer for receiving the signal outputted from the processing unit and the carrier wave signal outputted from the local oscillator and mixing the two signals for output; an A/D converter for receiving the mixed signal outputted from the signal mixer and converting the mixed signal into a digital signal to be outputted; an equalizer for receiving the converted signal outputted from said A/D converter and compensating for distortion of the converted signal to be outputted; and a signal restoring unit for receiving the distortion-compensated signal outputted from the equalizer, detecting the phase of the distortion-compensated signal and restoring the signal to an original signal.

10 Claims, 5 Drawing Sheets

CIRCUIT AND METHOD FOR REMOVING INTERFERENCE IN DIGITAL COMMUNICATION SYSTEM

CLAIM OF PRIORITY

This application makes reference to, incorporates the same herein, and claims all benefits accruing under 35 U.S.C. §119 from an application entitled CIRCUIT AND REMOVING INTERFERENCE IN DIGITAL COMMUNICATION SYSTEM earlier filed in the Korean Industrial Property Office on Jan. 10, 1997, and there duly assigned Serial No. 97-479 by that Office.

BACKGROUND OF THE INVENTION

1. Technical Field

The present invention relates to a circuit and method for detecting the phase of a received signal and removing interference from the received signal in a demodulation circuit of a digital communications system. More particularly, the invention relates to a circuit for removing interference from the received signal by using an adaptive time domain equalizer.

2. Related Art

Typically, a demodulation circuit in a digital communications system includes a signal processing unit, two mixers, two A/D converters and a phase restoring unit. A local oscillator is connected directly to one of the mixers and, through a phase shift unit, to the other of the mixers. A symbol clock restoring unit is connected to each of the A/D converters.

Such a demodulation circuit in a digital communications system has been burdened by disadvantages in the past. As a result, there has been a need to develop a demodulation circuit for a digital communications system, wherein the demodulation circuit further includes an equalizer connected between each of the A/D converters and the phase restoring unit. However, there has been a further problem in that the construction of a logic circuit for restoring phase to the signal being processed is complicated. A further problem resides in the fact that the operational range of the A/D converters cannot be sufficiently utilized. This causes the input to the A/D converters to be reduced, and this results in a quantization error.

Therefore, there is a need to develop a circuit and method for removing interference by restoring phase, and there is a further need to develop such a circuit and method for removing interference so as to reduce quantization error generated by the A/D converters. There is also a need to develop a circuit and method for removing interference of a common signal and an orthogonal a phase signal.

The following patents are considered to be representative of the prior art relative to the present invention, but are burdened by the disadvantage discussed above: U.S. Pat. No. 5,524,124 to Koening, entitled Multiple-Filter Equalizer For Structured Digitally Modulated Signals, U.S. Pat. No. 5,519,727 to Okanoue et al., entitled Adaptive Equalizer, U.S. Pat. No. 5,502,507 to Kim, entitled Equalization Apparatus With Fast Coefficient Updating Operation, U.S. Pat. No. 5,418,816 to Yamamoto, entitled Automatic Equalizer, U.S. Pat. No. 5,394,110 to Mizoguchi, entitled Demodulation System Having Adaptive Matched Filter And Decision Feedback Equalizer, U.S. Pat. No. 5,363,411 to Furuya et al., entitled Low Power Consumption Receiver With Adaptive Equalizer, U.S. Pat. No. 5,251,233 to Labedz et al., entitled Apparatus And Method For Equalizing A Corrupted Signal In A Receiver, U.S. Pat. No. 5,157,690 to Buttle, entitled Adaptive Convergent Decision Feedback Equalizer, U.S. Pat. No. 4,730,343 to Kanemasa et al., entitled Decision Feedback Equalizer With A Pattern Detector, U.S. Pat. No. 4,703,282 to Yoshida, entitled Digital Demodulation System, U.S. Pat. No. 4,468,786 to Davis, entitled Nonlinear Equalizer For Correcting Intersymbol Interference In A Digital Data Transmission System, U.S. Pat. No. 4,320,523 to Horikawa et al., entitled Digital Signal Reception System, and U.S. Pat. No. 4,021,738 to Gitlin et al., entitled Adaptive Equalizer With Fast Convergence Properties.

SUMMARY OF THE INVENTION

It is, therefore, an object of the present invention to provide a circuit and a method for removing interference by restoring phase.

It is another object to provide a circuit and a method for removing interference so as to reduce quantization error generated by an A/D converter.

It is still another object to provide a circuit and a method for removing interference of a common signal and an orthogonal phase signal.

To accomplish the above objects, the present invention provides a circuit and method for removing interference in a digital communications system. The circuit includes: a signal processing unit for inputting a given signal and limiting the band of the signal, thereby distributing the signal to be outputted; a local oscillator for producing a carrier wave signal to be outputted; a signal mixer for receiving and mixing the signal outputted from the processing unit and the carrier wave signal outputted from the local oscillator, and providing the mixed signal as an output; an A/D converter for receiving the mixed signal from the signal mixer and for converting it into a digital signal for output; an equalizer for receiving the converted signal outputted from the A/D converter, and for compensating for distortion of the converted signal; and a signal restoring unit for receiving the distortion-compensated signal from the equalizer, for detecting the phase of the distortion-compensated signal, and for restoring the signal to an original signal.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
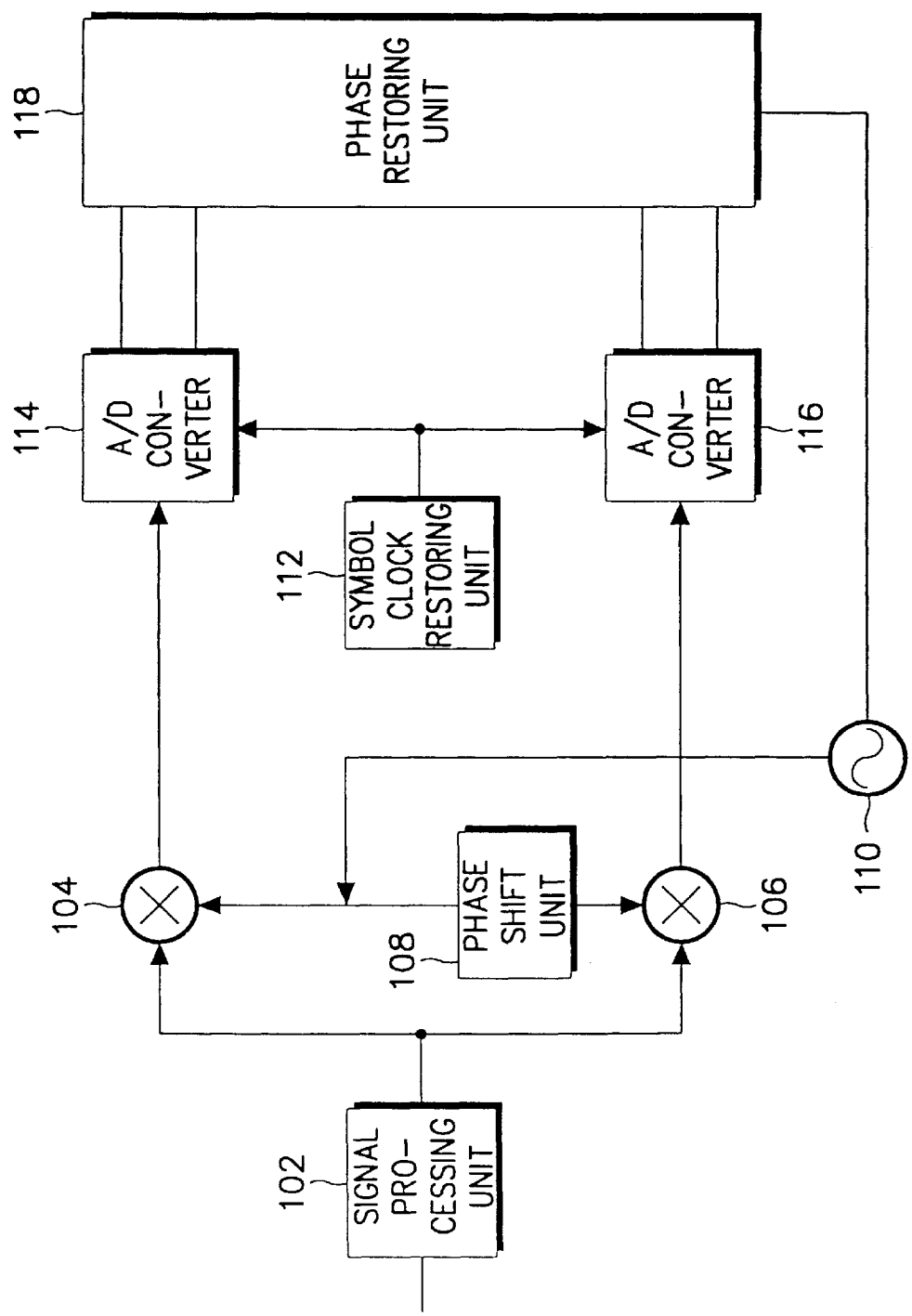
FIG. 1 is a block diagram of a demodulation circuit in a digital communications system.

Now, a preferred embodiment of the present invention will be described in detail with reference to the accompanying drawings. Throughout the drawings, it is noted that the same reference numerals or letters will be used to designate the same or equivalent elements having the same function.

FIG. 1 is a block diagram illustrating a demodulation circuit in a digital communications system. The circuit includes a signal processing unit 102, mixers 104 and 106, a phase shift unit 108, a local oscillator 110, a symbol clock restoring unit 112, analog to digital (A/D) converters 114 and 116, and a phase restoring unit 118.

Referring to FIG. 1, the signal processing unit 102 receives a given signal and outputs given band signals therefrom, thereby distributing the band signals for input to the mixers 104 and 106. The local oscillator 110 produces signals that correspond to carrier waves being respectively inputted to the mixers 104 and 106. The phase shift unit 108 operates in accordance with an oscillating frequency, produced by the local oscillator 110, so as to cause the two carrier waves to have a phase difference of 90°, so as to carry out a complex demodulation method. The mixer 104 receives the band signals outputted from the signal processing unit 102 and a common signal of the carrier waves produced by local oscillator 110. Then, the mixer 104 mixes the band signal and the carrier wave signal, and converts the mixed signal to an I-channel signal as a baseband signal for output to A/D converter 114.

The mixer 106 receives the band signal outputted from the signal processing unit 102 and an orthogonal phase signal outputted from the phase shift unit 108. At this point, the orthogonal phase signal corresponds to the carrier wave having a phase difference of 90° due to operation of the phase shift unit 108. Then, the mixer 106 mixes the two signals and converts the mixed signals to a Q-channel signal forming a baseband signal having a phase difference of 90° with respect to the I-channel signal. In the digital communications system, a demodulation circuit recovers a digital information signal from the baseband signal, such as the I-channel signal and Q-channel signal. In order to restore the digital information signal, a symbol instantaneously inputted should be first restored. Accordingly, restoration of a symbol clock should take place. The symbol clock restoring unit 112 restores the symbol clock according to a signal squaring method. The symbol clock restoring unit 112 restores the frequency of the clock, as well as the clock, for information as to the point required for sampling. The A/D converters 114 and 116 receive the I-channel signal and Q-channel signal, respectively, as baseband signals in accordance with the restored symbol clock outputted from the symbol clock restoring unit 112. Converters 114 and 116 sample the signals, convert them, and output the results of conversion as a digital word. The phase restoring unit 118 extracts phase information from the digital word and detects the phase, thereby restoring it to an original signal to be outputted.

Figure 2:
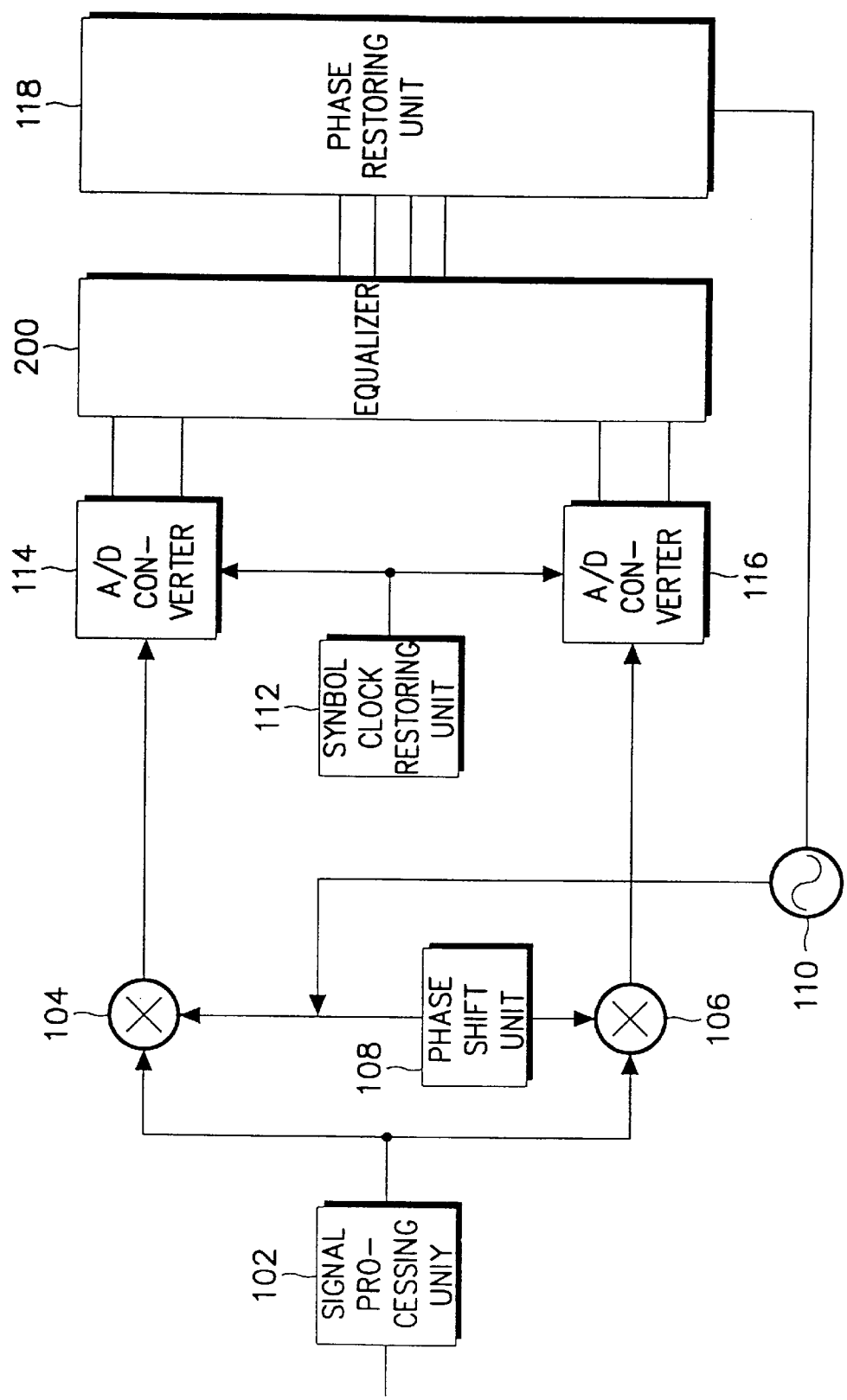
FIG. 2 is a block diagram of a demodulation circuit using an adaptive time domain equalizer in a digital communications system according to the present invention.

FIG. 2 is a block diagram illustrating the construction of a demodulation circuit using an adaptive time domain equalizer in the digital communications system in accordance with the present invention. The circuit comprises signal processing unit 102, mixers 104 and 106, phase shift unit 108, local oscillator 110, symbol clock restoring unit 112, A/D converters 114 and 116, phase restoring unit 118, and an adaptive time domain equalizer 200.

The construction and operation of the demodulation circuit of FIG. 2 are similar to those of FIG. 1 except that the adaptive time domain equalizer 200 is added in FIG. 2.

Referring to FIG. 2, the adaptive time domain equalizer 200 receives digital words outputted from the A/D converters 114 and 116, compensates for signal distortion, and outputs the results to the phase restoring unit 118.

Figure 3A:
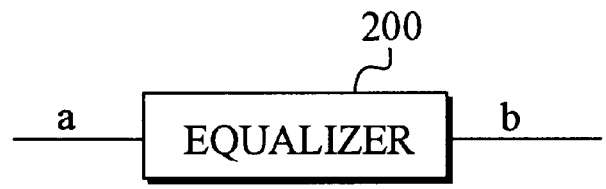
FIGS. 3A and 3B are views of an adaptive time domain equalizer and its input/output constellations, respectively.
Figure 3B:
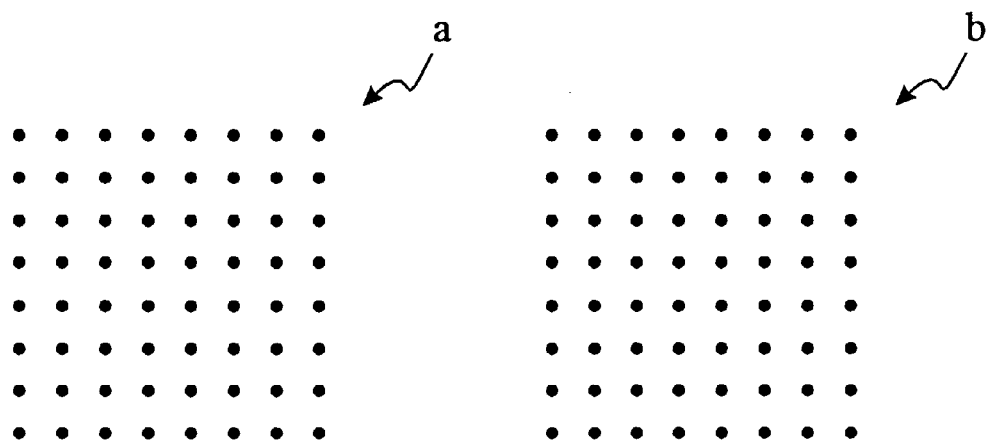

FIGS. 3A and 3B are views of an adaptive time domain equalizer and input/output constellations, respectively. The equalizer set with a real number 1 does not contain an imaginary composition.

Referring to FIG. 3B, the constellation of an input signal inputted to the equalizer 200 is designated by "a", and the constellation of an output signal outputted from the equalizer is designated by "b".

In the adaptive time domain equalizer of FIG. 3A, there has been a problem in that the construction of a logic circuit for restoring phase is complicated. There has been another problem in that the operational range of the A/D converters cannot be sufficiently utilized, thereby causing the input to the A/D converters to be reduced, resulting in a quantization error.

Figure 4:
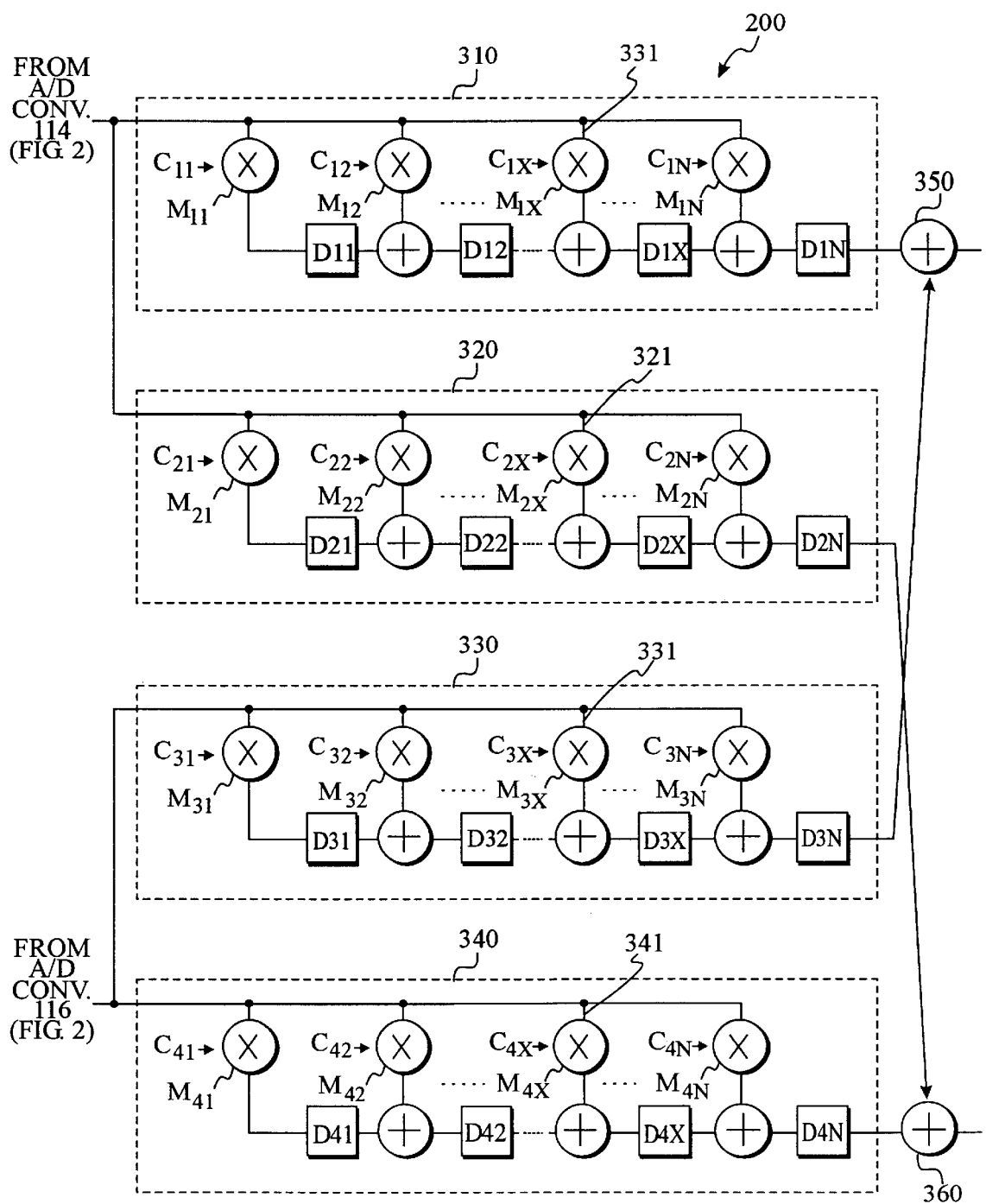
FIG. 4 is a circuit diagram illustrating an adaptive time domain equalizer according to an embodiment of the present invention.

FIG. 4 is a circuit diagram illustrating an adaptive time domain equalizer according to an embodiment of the present invention. The equalizer 200 comprises four qualifying impulse response filters 310, 320, 330 and 340.

Figure 5A:
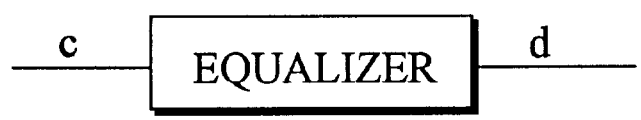
FIGS. 5A and 5B are views of an adaptive time domain equalizer and its input/output constellations, respectively, according to an embodiment of the present invention.
Figure 5B:
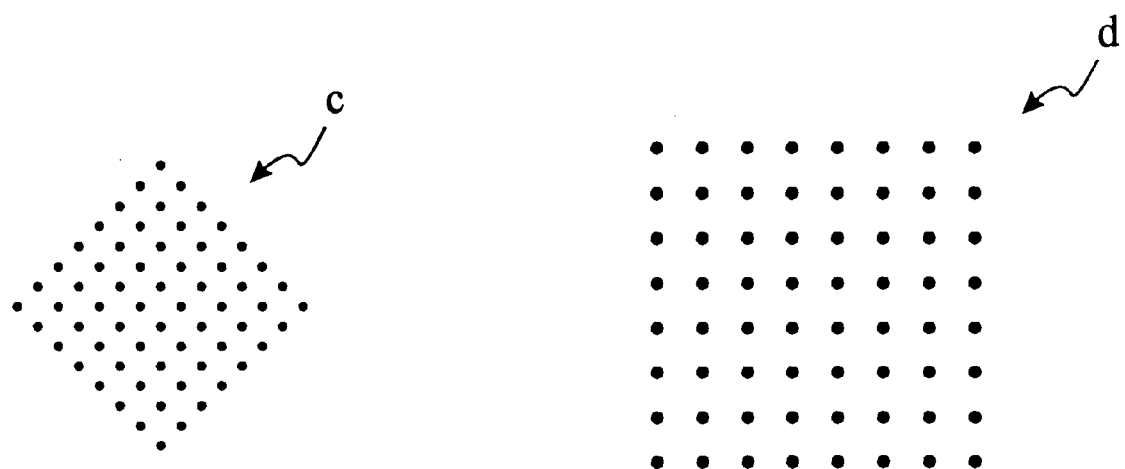

FIGS. 5A and 5B are views of an adaptive time domain equalizer and its input/output constellations, respectively, according to an embodiment of the present invention. In FIG. 5B, the designation "c" indicates a constellation for the I-channel signal and Q-channel signal inputted to the equalizer, and the phase is distorted by as much as 45 degrees. The designation "d" represents a constellation for an output signal outputted from the equalizer.

Referring to FIGS. 2 and 4, a qualifying impulse response filter 310 receives an I-channel signal outputted from the A/D converter 114 and removes the interference of a common signal corresponding to a real number composition. That is, the qualifying impulse response filter 310 receives the I-channel signal outputted from the A/D converter 114 and multiplies it by each of a plurality of tap coefficients C11, C12, etc., in multipliers M11, M12, etc. Delay elements D11, D12, etc., delay each multiplier output by one clock cycle, accumulate, and then output to coupler 350. A middle tap, such as tap 311, serves as a reference tap with respect to the taps constituting the qualifying impulse response filter 310. On the basis of tap 311, a right-tap compensates a preceding signal and a left-tap compensates a next signal. The tap 311 has a coefficient constituted by a real number 1, and removes the interference of the common signal corresponding to a real number composition of the received signal.

A qualifying impulse response filter 320 receives the I-channel signal outputted from the A/D converter 114 and removes the interference of an orthogonal phase signal corresponding to an imaginary number composition. That is, the qualifying impulse response filter 320 receives the I-channel signal outputted from the A/D converter 114, multiplies it by each of a plurality of tap coefficients C21, C22, etc. in multipliers M21, M22, etc. Delay elements D21, D22, etc. delay each multiplier output by one clock cycle, accumulate, and output to coupler 360. A middle tap, such as tap 321, serves as a reference tap of the qualifying impulse response filter 320 and has a tap coefficient fixed at 1.

A qualifying impulse response filter 330 receives a Q-channel signal outputted from an A/D converter 116, and removes the interference of an orthogonal phase signal corresponding to an imaginary number composition. That is, the qualifying impulse response filter 330 receives the Q-channel signal outputted from the A/D converter 116, multiplies it by each of a plurality of tap coefficients C31, C32, etc in multipliers M31, M32, etc. Delay elements D31, D32, etc. delay each multiplier output by one clock cycle, accumulate, and then output to coupler 350. A middle tap, such as tap 331, serves as a reference tap of the qualifying impulse response filter 330 and has a tap coefficient fixed at −1.

A qualifying impulse response filter 340 receives the Q-channel signal outputted from the A/D converter 116 and multiplies it by each of a plurality of tap coefficients C41, C42, etc., in multipliers M41, M42, etc. Delay elements D41, D42, etc., delay each multiplier output by one clock cycle, accumulate, and then output to coupler 360. A middle tap, such as tap 341, serves as a reference tap of the qualifying impulse response filter 340 and has a tap coefficient fixed at 1.

As mentioned above, the adaptive time domain equalizer, according to an embodiment of the present invention, comprises a qualifying impulse response filter for initializing a middle tap coefficient as 1+i for I channel and 1−i for Q channel. This matches 45 degree rotation of the coordinate axis.

Signal coupler 350 receives a signal outputted from the qualifying impulse response filter 310 and a signal outputted from the qualifying impulse response filter 330, thereby coupling and outputting them. Signal coupler 360 receives a signal outputted from the qualifying impulse response filter 320 and a signal outputted from the qualifying impulse response filter 340, thereby coupling and outputting them. A signal inputted to the equalizer is multiplied by a middle tap coefficient and is indicated by an output constellation, as shown in FIG. 5(b), thereby allowing the phase restoring unit 118 to normally restore the signal outputted from the adaptive time domain filter 220.

The present invention, as mentioned above, has an advantage in that a quantization error generated from the A/D converters 114 and 116 is reduced by as much as 3 dB, and demodulation is readily executed. Also, the interference of a signal generated from the digital communications system is removed.

While there have been illustrated and described what are considered to be preferred embodiments of the present invention, it will be understood by those skilled in the art that various changes and modifications may be made, and equivalents may be substituted for elements thereof without departing the true scope of the present invention.

What is claimed is:

1. A circuit for removing interference in a digital communications system, said circuit comprising:

signal processing means for receiving a given signal and for limiting a band of said given signal, thereby providing an output signal;

local oscillator means for producing a carrier wave signal;

signal mixer means for receiving and mixing said output signal from said signal processing means and said carrier wave signal from said local oscillator means to provide a mixed signal;

A/D converter means for receiving and converting said mixed signal to produce a digital signal to be outputted;

equalizer means for receiving said digital signal from said A/D converter means and for compensating for distortion of said digital signal to produce a distortion-compensation signal, said equalizer means comprising an adaptive time domain equalizer including four qualifying impulse filters, two of said four qualifying impulse response filters including means for removing interference of a common signal corresponding to a real number composition, and another two of said four qualifying impulse response filters including means for removing interference of an orthogonal phase signal corresponding to an imaginary number composition; and signal restoring means for receiving said distortion-compensated signal from said equalizer means, and for detecting a phase of said distortion-compensated signal so as to restore said distortion-compensated signal to an original signal.

2. A circuit for removing interference in a digital communications system, said circuit comprising:

signal processing means for receiving a given signal and for limiting a band of said given signal, thereby providing an output signal;

local oscillator means for producing a carrier wave signal;

signal mixer means for receiving and mixing said output signal from said signal processing means and said carrier wave signal from said local oscillator means to provide a mixed signal;

A/D converter means for receiving and converting said mixed signal to produce a digital signal to be outputted; and equalizer means for receiving said digital signal from said A/D converter means and for compensating for distortion of said digital signal to produce a distortion-compensation signal, said equalizer means comprising an adaptive time domain equalizer including four qualifying impulse filters, and each of said four qualifying impulse response filters having a middle tap coefficient set at 1+i for I channel and 1−i for Q channel.

3. A circuit for removing interference in a digital communications system, said circuit comprising:

signal processing means for receiving a given signal and for limiting a band of said given signal, thereby providing an output signal;

local oscillator means for producing a carrier wave signal;

signal mixer means for receiving and mixing said output signal from said signal processing means and said carrier wave signal from said local oscillator means to provide a mixed signal;

A/D converter means for receiving and converting said mixed signal to produce a digital signal to be outputted; and equalizer means for receiving said digital signal from said A/D converter means and for compensating for distortion of said digital signal to produce a distortion-compensation signal, said equalizer means comprising an adaptive time domain equalizer including four qualifying impulse filters, and said equalizer means including a first portion for removing interference of a common signal corresponding to a real number composition, and a second portion for removing interference of an orthogonal phase signal corresponding to an imaginary number composition.

4. The circuit as claimed in claim 3, wherein each of said first and second portions comprises a qualifying impulse response filter having a middle tap coefficient set at 1+i for I channel and 1−i for Q channel.

5. A circuit for removing interference in a digital communication system, said circuit comprising:

signal processing means for receiving a given signal and for limiting a band of said given signal, thereby providing an output signal;

mixer means for receiving and mixing said output signal of said signal processing means with a carrier wave signal to provide a mixed signal;

converter means for receiving and converting said mixed signal to produce a digital signal for output;

equalizer means for receiving said digital signal from said converter means and for compensating for distortion of said digital signal to produce a distortion-compensated signal, said equalizer means comprising an adaptive time domain equalizer including four qualifying impulse filters, two of said four qualifying impulse response filters including means for removing interference of a common signal corresponding to a real number composition, and another two of said four qualifying impulse response filters including means for removing interference of an orthogonal phase signal corresponding to an imaginary number composition; and signal restoring means for receiving said distortion-compensated signal from said equalizer means, and for restoring said distortion-compensated signal to an original signal.

6. A circuit for removing interference in a digital communication system, said circuit comprising:

signal processing means for receiving a given signal and for limiting a band of said given signal, thereby providing an output signal;

mixer means for receiving and mixing said output signal of said signal processing means with a carrier wave signal to provide a mixed signal;

converter means for receiving and converting said mixed signal to produce a digital signal for output;

equalizer means for receiving said digital signal from said converter means and for compensating for distortion of said digital signal to produce a distortion-compensated signal, said equalizer means comprising an adaptive time domain equalizer including four qualifying impulse filters, and each of said four qualifying impulse response filters having a middle tap coefficient set at 1+i for I channel and 1−i for Q channel; and signal restoring means for receiving said distortion-compensated signal from said equalizer means, and for restoring said distortion-compensated signal to an original signal.

7. A circuit for removing interference in a digital communication system, said circuit comprising:

signal processing means for receiving a given signal and for limiting a band of said given signal, thereby providing an output signal;

mixer means for receiving and mixing said output signal of said signal processing means with a carrier wave signal to provide a mixed signal;

converter means for receiving and converting said mixed signal to produce a digital signal for output;

equalizer means for receiving said digital signal from said converter means and for compensating for distortion of said digital signal to produce a distortion-compensated signal, said equalizer means comprising an adaptive time domain equalizer including four qualifying impulse filters, and said equalizer means including a first portion for removing interference of a common signal corresponding to a real number composition, and a second portion for removing interference of an orthogonal phase signal corresponding to an imaginary number composition; and signal restoring means for receiving said distortion-compensated signal from said equalizer means, and for restoring said distortion-compensated signal to an original signal.

8. The circuit as claimed in claim 7, wherein each of said first and second portions comprises a qualifying impulse response filter having a middle tap coefficient set at 1+i for I channel and 1−i for Q channel.

9. A method for removing interference in a digital communication system, comprising the steps of:

(1) receiving a given signal;

(2) limiting a band of said given signal to produce an output signal;

(3) mixing said output signal with a carrier wave signal to provide a mixed signal;

(4) converting said mixed signal to produce a digital signal;

(5) compensating for distortion of said digital signal to produce a distortion-compensated signal;

(6) removing interference of a common signal corresponding to a real number composition, and removing interference of an orthogonal phase signal corresponding to an imaginary number composition; and (7) restoring said distortion-compensated signal to an original signal by detecting a phase of said distortion-compensated signal.

10. The method as claimed in claim 9, wherein said equalizing step further comprises utilizing an equalizer having a middle tap coefficient set at 1+i for I channel and 1−i for Q channel.

\* \* \* \* \*